W. S. THOMSON.
BEARING.
APPLICATION FILED APR. 26, 1917.
1,307,029.
Patented June 17, 1919.
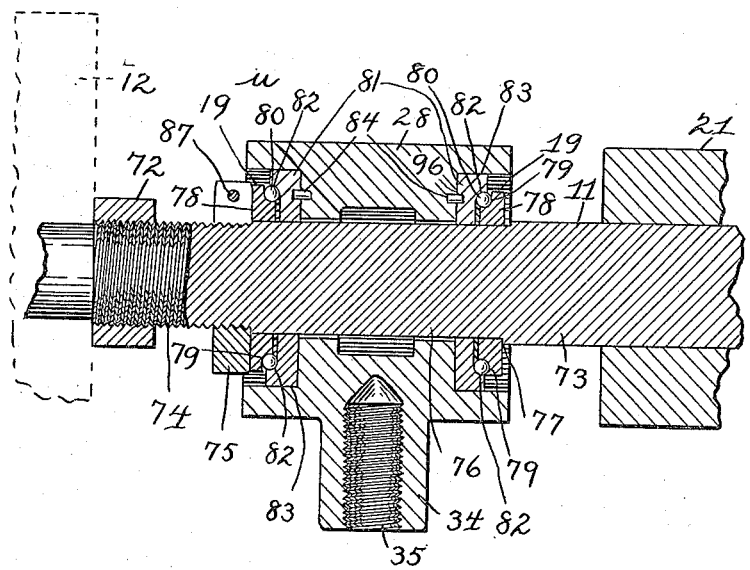
Inventor:
William Stratton Thomson
By Louis M. Schmidt
Attorney

UNITED STATES PATENT OFFICE.

WILLIAM S. THOMSON, OF PLANTSVILLE, CONNECTICUT, ASSIGNOR TO THE H. D. SMITH & COMPANY, OF PLANTSVILLE, CONNECTICUT.

BEARING.

1,307,029.  Specification of Letters Patent.  Patented June 17, 1919.

Application filed April 26, 1917. Serial No. 164.602.

*To all whom it may concern:*

Be it known that I, WILLIAM S. THOMSON, a citizen of the United States, residing at Plantsville, in the county of Hartford and State of Connecticut, have invented certain new and useful Improvements in Bearings, of which the following is a specification.

My invention relates to improvements in bearings and the object of my improvement is simplicity and economy in construction and convenience and efficiency in use and pertains to certain features shown and described but not claimed in the patent issued to me on April 27, 1915, No. 1,137,033.

In the accompanying drawing the single figure is a sectional view of part of a grinding machine, showing the invention.

The drawing shows a shaft 11 of a grinding machine that passes through a journal ing head 28. Mounted on the portion of the said shaft 11 on the inner side of the said head 28 is the driving pulley 21 and on the portion thereof on the outer side of the said head 28 is a grinding or polishing wheel 12.

The portion of the shaft 11 on which the said bearing 19 is mounted comprises the body portion 73 at the right on which the pulley 21 is mounted, and a threaded portion 74 at the left. The threaded portion 74 is elongated and has engaged therewith the inner nut 72 for securing or backing against the grinding wheel 12 and at the right the nut 75 for tightening the bearing 19. The bearing 19 is housed in the journal head proper 28 positioned on the reduced body portion 76 of the shaft 11 between the main body portion 73 and the bearing nut 75. At the junction of the main body portion 73 and the reduced body portion 76 is a shoulder 77 against which bears the inner of a pair of outer bearing rings 78 having on their inner faces cones 79 serving as raceways for the balls 80. The outer of the said outer bearing rings 78 is opposed to the bearing nut 75. In coöperation with the outer bearing rings 78 are inner bearing rings 81 having raceways 82 and these inner bearing rings 81 are positioned in annular recesses 83 in the ends of the head 28; and are held non-rotatively therein by pins 84 engaged with holes 96 in the opposed faces.

Tightening the bearing nut 75 operates to bring the raceways 79 and 82 into operative relation to the balls 80 and to hold the bearing 19 as a body against the shoulder 77. The bearing nut 75 is split on one side by a radial slot and the opposed portions are separated by the said slot provided with a transverse hole in which is positioned a locking screw 87, the hole in one of the members being threaded and receiving the threaded end of the said screw 87. When the bearing 19 has been adjusted to proper running condition the locking screw 87 is tightened to hold the particular adjustment. By making the threads for the bearing nut 75 and the inner or backing nut 72 the same I am enabled to have one continuous threaded portion 74 on the shaft 11 extending uninterruptedly from the bearing 19 to the grinding wheel 12. The bearing 19 described comprises a duplex structure having a raceway for balls 80 or a bearing proper one on each side of the supporting neck 35 and appreciably separated so that the load on the said neck 35 is evenly balanced relatively thereto.

I claim as my invention:—

1. In a grinding machine comprising a casing, a shaft, a pair of bearings housed in the said casing and engaged with the said shaft, journal heads in which the said bearings are housed, a stud supporting each of the said journal heads, and the said bearings comprising in each case a duplex bearing structure having two bearings proper, and one on each side of the axial line of the said stud.

2. In a grinding machine a shaft having means for securing a work wheel comprising a backing nut and a ball bearing engaged with the said shaft, adjacent the said work wheel, and having a bearing nut, the said nuts having the same thread, and the said shaft having a continuous threaded portion extending from the said work wheel to the said bearing.

3. In a grinding machine, a shaft having a main body portion supporting a driving pulley, a reduced body portion positioned in a journal head, and a shoulder at the junction of the said portions, a screw threaded portion adjacent the said reduced body portion extending over an appreciable portion of the length thereof, ball bearing devices housed in the said journal head, a nut on the said screw threaded portion coöperating with the said shoulder for positioning the said ball bearing devices, and a grinding wheel mounted on the said shaft and backed on one side by a nut on the said threaded portion.

WILLIAM S. THOMSON.

Witnesses:
GEO. R. BOND,
EDWARD H. CURTIS.

Copies of this patent may be obtained for five cents each, by addressing the "Commissioner of Patents, Washington, D. C."